(12) United States Patent
König et al.

(10) Patent No.: US 9,290,395 B2
(45) Date of Patent: Mar. 22, 2016

(54) METHODS FOR TREATING BODIES OF WATER

(75) Inventors: Wolfgang König, Wülfrath (DE);
Wolfgang Rabe, Bernsdorf (DE);
Günter Scholz, Hoyerswerda (DE)

(73) Assignee: Rheinkalk GmbH, Wulfrath (DE)

( * ) Notice: Subject to any disclaimer, the term of this patent is extended or adjusted under 35 U.S.C. 154(b) by 90 days.

(21) Appl. No.: 13/994,490

(22) PCT Filed: Dec. 19, 2011

(86) PCT No.: PCT/EP2011/073269
§ 371 (c)(1),
(2), (4) Date: Jul. 16, 2013

(87) PCT Pub. No.: WO2012/080514
PCT Pub. Date: Jun. 21, 2012

(65) Prior Publication Data
US 2013/0292344 A1    Nov. 7, 2013

(30) Foreign Application Priority Data

Dec. 17, 2010  (DE) .......... 10 2010 055 032
Dec. 17, 2010  (DE) .......... 10 2010 055 034

(51) Int. Cl.
*C02F 1/66* (2006.01)
*C02F 103/00* (2006.01)
*C02F 103/10* (2006.01)

(52) U.S. Cl.
CPC ............ *C02F 1/66* (2013.01); *C02F 2103/007* (2013.01); *C02F 2103/10* (2013.01)

(58) Field of Classification Search
CPC ... C02F 1/66; C02F 2103/007; C02F 2103/10
See application file for complete search history.

(56) References Cited

U.S. PATENT DOCUMENTS

| 8,617,402 | B2 | 12/2013 | Pust et al. | |
|---|---|---|---|---|
| 2006/0144798 | A1* | 7/2006 | Dixon et al. | 210/724 |
| 2010/0282688 | A1* | 11/2010 | Pust | C02F 1/66 210/746 |
| 2011/0042285 | A1* | 2/2011 | Scholz et al. | 210/170.05 |

FOREIGN PATENT DOCUMENTS

| DE | 20301323 | 5/2003 |
|---|---|---|
| DE | 10344857 | 4/2005 |
| DE | 102006001920 | 1/2006 |
| DE | 202008008390 | 2/2009 |
| DE | 102007043751 | 3/2009 |
| DE | 102007057414 | 6/2009 |
| DE | 102009049739 | 4/2011 |
| WO | 2009037194 | 3/2009 |

* cited by examiner

*Primary Examiner* — Lucas Stelling
(74) *Attorney, Agent, or Firm* — Honigman, Miller, Schwartz & Cohn LLP; Thomas A. Wootton; Jonathan P. O'Brien

(57) ABSTRACT

A method for stabilising or raising the pH of bodies of water and/or neutralising bodies of water is illustrated and described. According to the invention a feed material containing an unburnt lime product, the unburnt lime product having a granularity with a fraction <about 10 μm of ≥50%, is used to stabilise or raise the pH and/or neutralise bodies of water. With the aid of the proposed method the pH of bodies of water can be stabilised, raised and/or bodies of water can be neutralised effectively and in an ecologically harmless manner, and at low cost.

19 Claims, No Drawings

METHODS FOR TREATING BODIES OF WATER

CROSS REFERENCE TO RELATED APPLICATION

This U.S. patent application claims benefit of PCT application no. PCT/EP2011/073269, filed on Dec. 19, 2011, which claims the benefit of Germany Application Serial No(s). DE102010055034A, and DE102010055032A, both filed on Dec. 17, 2010. Each of these documents is hereby incorporated by reference in their entirety.

DESCRIPTION OF INVENTION

The invention relates to a method for treating bodies of water, in particular for stabilising or raising the pH and/or neutralising bodies of water, in which a feed material is introduced into a body of water to be treated. In addition the invention relates to the use of an unburnt lime product to treat bodies of water. Finally the invention includes an aqueous suspension containing the feed material as well as a water-borne craft for introducing the feed material into a body of water to be treated.

Acidic precipitations, possibly in combination with further anthropogenic factors, have over recent decades led to a constant reduction of the pH of bodies of water. This so-called water acidification, which occurs especially in bodies of water of low basicity, has a harmful effect on the environment. In strongly acidified bodies of water the pH values are regularly between 3.5 and 4.5. This acid loading has a negative effect on the biocoenoses of the affected bodies of water, since acid-sensitive species are displaced. A further negative effect of the acid loading is the increased release of toxic heavy metals (e.g. aluminium, lead, manganese, nickel, zinc) from local rocks or soils. One of the most striking effects of water acidification is ultimately the death of fish in highly acidified bodies of water. There may also be an increased acidification of ground water and surface bodies of water in the vicinity of mining and opencast operations. A problem of ore and coal mining is for example the formation of acidic mine waters. These can be formed if, as a result of the mining activity, oxygen reaches anoxic rock areas and there leads to an oxidation of iron disulphide minerals, such as for example pyrites or marcasite. The oxidation of iron disulphide to iron (III) and sulphate proceeds with the release of protons. As a result an opencast residual cavity becomes filled with acidic, sulphate-containing water with the formation of acidic opencast residual lakes.

Mining and in particular the use of opencast technology has led to the formation of cavities in the exploited terrain, which become filled with ground water and surface water. In many cases a lake landscape is formed by the recurring ground water as well as the associated geological and chemical conditions in the newly created overburden and rock cover, which is characterised by very acidic bodies of water. A further problem is the constant input of acidity to such bodies of water due to the inflowing ground water. The fall in pH to values of <6 combined with a possible rise in heavy metal contents, in particular of iron and aluminium, leads in many cases to a significant deterioration or decay of the biocoenosis formed in or introduced into the mining or opencast residual lake.

Various methods are known from the prior art for treating acidic bodies of water, wherein in practice so-called in-lake methods are in particular employed. The known methods have in common the fact that an alkaline substance is introduced in order to neutralise or raise the pH of the body of water to be treated.

DE 10 2006 001 920 A1 describes a two-stage method for improving the water quality of acidic bodies of water, in which in a first treatment stage, at a low pH value, a calcium- or calcium/magnesium-containing feed body is used, and in a second stage, at a higher pH value, sodium hydroxide is used. On the one hand overall high product use costs are necessary with this method. Furthermore, although a high efficiency is achieved in this way in the high pH range, nevertheless with even a slight overdose there is the danger, due to the high reactivity of sodium hydroxide, that the pH rises to >9, which can have a considerable harmful effect on the biocoenosis.

The use of burnt dolomite with a total fraction of CaO/MgO of >80% as feed material for treating acidic mining waters is known from DE 203 01 323 U1, wherein the feed material has a granularity of <200 µm with a fraction of >90% and a bulk density of >0.8 t/m$^3$. This is used to neutralise acidic mining waters and is said to be advantageous in particular with waters with high sulphate contents, since undesirable grit phenomena as a result of gypsum binding are avoided. On account of the very reactive feed material there is here also the problem, that in weakly acidic bodies of water even at slight overdosing rises in pH to >9 and thus ecological problems are to be expected.

DE 102007043751 A1 describes a method in which raising the pH in acidic bodies of water is carried out in at least two stages so that the concentration of the respectively employed neutralising agent suspensions is adjusted depending on the pH value. In this connection on the one hand the concentration of the feed material suspension in the higher pH range of >4.5 should be kept lower than in the lower pH range of <4.5. Furthermore burnt reactive products, such as quicklime or hydrated lime, should be used in the higher pH range and unburnt reactive products, such as chalk flour, should be used in the lower pH range. In this way an attempt is made to achieve a controlled rise in pH in the pH range >4 with protection of the biocoenosis. However, the disadvantage of this method is that, as a result of the efficiency when using unburnt chalk products in pH ranges of >4, large amounts of product with high charging costs have to be introduced. In addition the method is time-consuming, which in the short term cannot ensure the necessary reaction times. This can be attributed to the fact that the dissolution rate of unburnt chalk products, such as chalk flour, compared to acidic reaction partners decreases sharply with rising pH, for example starting at a pH of >4. With the granularity used in the prior art the predominant coarser fraction in the feed materials therefore only partially reacts at this pH value and sinks unused to the bottom.

From DE 20 2008 008 390 U1 a feed material for the treatment and care of acidic surface bodies of water is known, which consists of a mixture of burnt and/or slaked lime products and unburnt lime products. The disadvantage of the described feed material is that its production involves a high expenditure on logistics and equipment. Furthermore, on account of the low efficiency when using unburnt lime products in pH ranges of >4, large amounts of product with high charging costs have to be introduced.

A common feature of the methods known from the prior art is that the use of reactive calcined lime products, CaO or CaO×MgO, hydrated lime, hydrated dolomite and milk of lime, leads on account of the high sulphate fractions, which in bodies of water affected by mining operations can be up to >2,000 mg/l, to the formation of gypsum and grit, and therefore to low efficiencies until these feed materials become ineffective. This is presumably due to the fact that the calcined lime products become covered by a layer of gypsum. The gypsum layer can cause the particles to become coarser, sink more quickly and collect on the bottom of the body of water, where they undesirably greatly increase the pH value. A disadvantage of the grit formation is also that less reaction surface is available for neutralising the body of water. This can mean as a result that the proportion of the neutralising agent in the resultant iron hydroxide slurry is present in a corresponding excess. A further dissolution and reaction is hindered and the use of the product becomes ineffective. This problem is normally counteracted by adding neutral or low-sulphate water for the mashing, or by forming a dilute suspension, with increased expenditure and higher costs.

A further disadvantage of the methods known from the prior art and described above is that in weakly acidic bodies of water, when using these reactive products increases in pH to >9 and resultant ecological problems can occur even with slight overdosing. The same also applies to the chemical products sodium hydroxide and soda, which in addition are comparatively costly.

The use of more cost-beneficial but less reactive unburnt lime products, for example calcium carbonate commonly commercially available as chalk flour with D-50 values of >12 μm, is characterised in the pH range >6 by low process efficiencies combined with large amounts of sediment of unreacted feed product on account of the low solubility as well as the low reactivity. Accordingly such unburnt lime products are considered, if at all, only at lower pH values, and more reactive, mainly burnt lime products, are used for the complete neutralisation.

In addition a common feature of the methods known from the prior art is that a neutralisation of the body of water, even when it is achieved, is of short duration due to the constant inflow of acid-forming ground water. The inflow of acidity, especially in the form of reaction products of pyrites weathering ($Fe^{2+}$, $Fe^{3+}$, $SO4^{2-}$) leads as a rule to a renewed drop in pH to values of <6 and a possible rise in heavy metal contents, in particular of iron and aluminium, which overall can adversely affect or kill the biocoenosis formed in or introduced into the mining lake. In order to counteract this and maintain neutral conditions, in addition to an initial neutralisation further cyclically repeated booster treatments must therefore be carried out on a regular basis.

Starting from the prior art discussed above, an object of the invention was to provide an inexpensive method with which acidic bodies of water can be treated in a simple and economically effective manner and which moreover can guarantee the success of the treatment over a fairly long period of time.

This object is achieved according to the invention by the method disclosed in claim 1, the use disclosed in claim 15, the aqueous suspension mentioned in claim 16, as well as the water-borne craft mentioned in claim 17.

Advantageous modifications of the invention are given in the dependent claims and, like the general inventive concept, are discussed in detail hereinafter.

In the method according to the invention for treating bodies of water, in conformity with the prior art mentioned above a feed material is introduced into a body of water to be treated. According to the invention a feed material is used that contains an unburnt lime product, in particular a fine-grain unburnt lime product, wherein the unburnt lime product has a granularity with a fraction <about 10 μm of ≥50%.

It has surprisingly been found that the fine granularity of the unburnt lime product in the feed material means that unburnt, cheaper lime products can be used despite their lower reactivity to treat bodies of water, and that the success of the treatment is also maintained over a longer period of time. Without wishing to be bound to scientific theory, it appears that this surprising effect can be explained by the fact that the fine particles of the unburnt lime product in the feed material according to the invention do not sink to the bottom of the body of water, but float in the form of a particle cloud in the body of water and there counteract as a buffer substance a renewed drop in pH due to inflowing acidic ground water.

Due to the lower reactivity of the unburnt lime product, the danger inherent in more highly reactive lime products of a rise to strongly alkaline pH ranges due to overdosing is avoided. Also, the unburnt lime product contained in the feed material according to the invention reacts less rapidly than the more reactive lime products known from the prior art, as a result of which a sufficient buffer capacity can also be maintained over a longer period of time.

When assessing the method according to the invention, the disadvantage of the use of commercially available unburnt lime products known from the prior art appears on reflection to be due to the fact, before a reaction can occur at all with the less reactive feed material, the latter sinks to the bottom of the body of water and is no longer available for reaction. Thus, the use of commercially available $CaCO_3$ (e.g. chalk flour, D-50 value >12 μm) in the pH range >6 leads on account of the low solubility as well as the low reactivity to low process efficiencies combined with large sedimentations of unreacted feed material.

In contrast to this the unburnt lime product contained in the feed material according to the invention can float or remain in suspension due to its fine granularity, and a sedimentation to the bottom of the body of water to be treated is avoided. Surprisingly the combination of a per se less reactive, unburnt lime product with the fine granularity according to the invention leads to excellent treatment results, which in particular can be maintained over a relatively long period of time. Thus for example the use of the method according to the invention to neutralise acidic bodies of water leads to a pH stabilisation that lasts for months. In contrast to the methods known from the prior art, the method according to the invention provides an ecologically safe, economic solution for the in-lake treatment of acidic bodies of water, with which a lasting adjustment of the pH to ≥6 combined with a sufficiently high efficiency of the employed feed material can be achieved, even with inflow of acidity via the ground water or from other sources, over periods of up to several months.

In addition, due to the use according to the invention of unburnt lime products the pH fluctuations harmful for the biocoenosis are avoided, which were observed with the introduction at specified intervals of the hitherto conventional, more reactive burnt lime products.

Bodies of water in the context of the invention are understood to be any type of body of water, in particular surface bodies of water, ground water, flowing and/or stationary bodies of water. The method according to the invention is particularly suitable for treating surface bodies of water, in particular of natural lakes and/or mining and opencast residual lakes. The invention is of particular practical relevance especially for the treatment of open acidic bodies of water, especially opencast lakes with a water volume of >500,000 m³. Such bodies of water are often characterised by re-acidification due to a constant input of acidity with the inflowing ground water or other acidic sources.

When the term fine granularity of the feed material or of the lime product is used here, this is understood to mean in particular a granularity with at least a fraction <about 10 μm of 50%, a mean particle size of less than about 40 μm, and/or particle sizes of about 0.01 to about >60 μm.

A preferred embodiment of the invention envisages that the feed material contains an unburnt lime product that has a granularity with a fraction <about 10 µm of ≥50%. Optimal results are achieved if the unburnt lime product has a granularity with a fraction <about 4 µm of ≥50%, in particular a fraction <about 3 µm of ≥50%. Tests have shown that unburnt lime products with a coarser granularity do not produce the long-term neutralisation according to the invention and a cyclical re-treatment is necessary. This is presumably due to the fact that feed materials, in particular the unburnt lime products contained therein with a coarser granularity are not able to float and therefore sink to the bottom of the lake, which means that in the long term these materials are not available for a neutralisation reaction.

When the term granularity is used here, this is understood to mean the range in µm of the particle diameters. Specifying the granularity in "fraction smaller than x µm of ≥50%" corresponds to the specification widely used in lime products of the particle size distribution in the form of the D-50 value. The person skilled in the art understands by a D-50 value of 10 µm that 50% or more of the particles have a particle diameter less than 10 µm. The measurement results are in this connection evaluated volumetrically. Standard methods for determining the granularity of lime products are known to the person skilled in the art. The determination of the particle sizes, their distribution as well as their mean particle size by means of laser diffractometry, which is also termed laser granulometry or laser diffraction, has proved to be particularly practicable (see ISO Standard 13320-1). The degree of granularity and particle sizes given here refer, unless otherwise stated, to values determined by means of volumetric laser diffractometry. In this connection the particle size x (µm) with a volume throughput (D) of 50% is given as the D-50 value. The commercially available laser diffractometers (e.g. laser diffraction sensors of the Helos type from the Sympatec company) provide over a measurement range from about 0.1 µm to about 8.75 mm reliable and rapid measurements of both the particle sizes and their distribution in a sample. However, other measurement methods are also possible for determining the particle size, for example by means of microscopy or by measuring the sieve diameter.

According to a further embodiment of the invention the unburnt lime product has a granularity with a mean particle size of about 0.05 to about 40 µm, in particular a mean particle size of about 0.05 to about 20 µm. In addition to the feature of the mean particle size, the unburnt lime product can also have the previously mentioned particle size distributions (D-50 values). Accordingly a particular embodiment of the invention envisages that the feed material contains an unburnt lime product that has the aforementioned D-50 values and/or has a granularity with a mean particle size of about 0.05 to about 40 µm, in particular a mean particle size of about 0.05 to about 20 µm. Tests have shown that unburnt lime products of coarser granularity do not lead to the long-term neutralisation according to the invention. In particular, in contrast to the fine-grain unburnt lime product according to the invention, there may be a re-acidification due to inflow of acidic ground water, which cannot be buffered. This is presumably due to the fact that feed materials, in particular unburnt lime products, with a coarser granularity cannot float and therefore sink to the bottom of the lake, and are thus unavailable over the long term for a neutralisation reaction. Unburnt lime products with granularities with a mean particle size of below about 0.05 µm can be obtained only with difficulty and do not represent an economic alternative.

The teaching in accordance with the invention can according to a further embodiment according to the invention also be accomplished if the feed material contains an unburnt lime product that has a granularity of about 0.01 to about 60 µm, in particular of about 0.01 to about 40 µm. Optimal results are obtained if the unburnt lime product has a granularity of about 0.01 to about 20 µm or a granularity selected from the range consisting of less than about 60 µm, less than about 40 µm, less than about 30 µm, and less than about 20 µm. Unburnt lime products with a coarser granularity do not exhibit the long-lasting neutralisation action according to the invention. Finer unburnt lime products with granularities below 0.01 µm are difficult to produce and therefore do not represent an economic alternative. In addition, the unburnt lime product contained in the feed material according to the invention can also have one of the previously described particle size distributions (D-50 values) and/or one of the previously described mean particle sizes.

According to a further embodiment of the invention a method is provided for stabilising the pH of weakly acidic surface bodies of water, in which the feed material in the form of a suspension in water is introduced into the body of water to be treated, characterised in that to stabilise the pH of weakly acidic surface bodies of water in the pH range from 5 to 7.5, an unburnt fine-grain lime product with a $CaCO_3$ fraction of >85% is used as feed material, the feed material has in this connection a granularity of 0 to 40 µm and is applied by means of charging systems in a suspension concentration of 1 to 15 Ma. % batchwise with respectively 20 to 500 g/m$^2$ to surface regions of respectively 20,000 to 100,000 m$^2$.

The teaching in accordance with the invention can according to a further embodiment according to the invention also be accomplished if the feed material for stabilising the pH of weakly acidic surface bodies of water is introduced in a suspension in water into the body of water to be treated, characterised in that in order to stabilise the pH of weakly acidic surface bodies of water in the pH range from 5.0 to 7.5, the feed material from a fine microcrystalline sedimentary rock, which consists >85% of calcium carbonate precipitated by photosynthetic removal of carbon dioxide and has an overall age of 50 to 140 million years, is an unburnt fine-grain lime product and the feed material has a granularity of 0.1 to 40 µm and the fraction <4 µm is ≥50%. In particular the feed material can have a granularity of 0.1 to 20 µm and in this case the fraction <3 µm is preferably ≥50%.

Lime products in the sense of the invention are understood to be all products obtained from carbonate rocks. In particular the term lime product used here should also include dolomitic limestone and dolomite. Lime products based on limestone have provided optimal results in practical tests.

According to the invention an unburnt lime product is preferably used as feed material. Preferably the feed material consists substantially of unburnt lime products. It is however also possible for the feed material to contain, in addition to lime product, also proportions of burnt lime products and/or other additives.

An unburnt lime product with a proportion of $CaCO_3$ of >85 wt. % has proved to be a particularly suitable unburnt lime product for the method according to the invention.

A natural substance that fulfils this requirement and also has the fine granularity specified according to the invention is for example fine chalk. Fine chalk is a fine microcrystalline sedimentary rock that consists >about 85 wt. % of calcium carbonate precipitated by photosynthetic extraction of carbon dioxide. Fine chalk has as a rule an approximate age of about 50 to about 140 million years. Since fine chalk is commercially available ready for use, it constitutes a particularly suitable fine-grain lime product for use in the method according to the invention.

It has been found that a very fine-grain feed material can prepared without expensive grinding operations by using a microcrystalline sedimentary rock such as fine chalk. In this case a microcrystalline sedimentary rock such as fine chalk, which for use as a feed material constituent or as feed material preferably has a mean granularity of about 0.01 to about 20 µm, provides optimal results. The fraction <about 4 µm is in this connection preferably ≥50%.

Apart from fine chalk, any other fine microcrystalline sedimentary rock that consists in an amount of about >85 wt. % of calcium carbonate precipitated by photosynthetic carbon dioxide extraction, can also be used as particularly suitable unburnt lime product according to the invention. The sedimentary rock preferably has an approximate age of about 50 to about 140 million years. Mixtures of fine chalk and other sedimentary rocks are also possible.

Apart from the treatment of bodies of water in general, the method according to the invention can be used in particular to stabilise the pH, raise the pH and/or to neutralise bodies of water. According to a preferred embodiment the feed material according to the invention is used to stabilise the pH of acidic bodies of water. Acidic means in this connection a pH value of the body of water of below about 7.5, in particular between about 2 and about 7.5.

The feed material according to the invention is also suitable for stabilising the pH of weakly acidic bodies of water, in other words bodies of water in the pH range from about 5 to about 7.5. This is a surprising property of the feed material envisaged in the method according to the invention, since unburnt lime products have not previously been recommended for use as alkaline substances in this pH range for in-lake methods (see DE 10 2007 043 751 A1).

According to a further embodiment of the method according to the invention, a strongly acidified body of water can first of all be subjected in a first stage to an initial neutralisation, or at least the pH value can be raised to the weakly acidic pH range. This can be achieved by introducing an unburnt lime product with a commercially conventional granularity, for example chalk flour, as well as with other feed materials known to the person skilled in the art from the prior art. In a second stage, mainly for stabilising the pH and/or buffering, the body of water is treated with the feed material according to the invention, in particular one that contains an unburnt fine-grain lime product with a granularity having a proportion <about 10 µm of ≥50%.

In practical tests it was found that the method according to the invention represents an ecologically harmless, economic solution for the in-lake treatment of weakly acidic bodies of water. In particular a permanent adjustment of the pH value to ≥about 6 combined with a sufficiently high efficiency of the employed feed material can be achieved with the method according to the invention, even with inflow of acidity via the ground water or from other sources, for periods of up to several months.

According to a preferred embodiment of the invention the treatment with the fine-grain unburnt lime product or feed material according to the invention can also simply be used to form a buffer cloud in a body of water that had previously been neutralised by other methods and/or already exhibited per se a suitable pH value.

In principle various methods are known to the person skilled in the art that are suitable for introducing the feed material into the body of water to be treated. Practical tests have shown that optimal results are achieved if the feed material in the form of a suspension in water is introduced into the body of water to be treated or is applied to the body of water to be treated.

Accordingly, the present invention provides according to a further embodiment an aqueous suspension containing at least one unburnt lime product according to the invention, in particular one having a granularity with a fraction <about 10 µm of ≥50%, for treating bodies of water. In practice the suspension according to the invention can be prepared shortly before being introduced into the body of water to be treated. Ready-for-use, storable suspensions or previously prepared mixtures are however also conceivable.

Suitable concentration ranges for the aqueous feed suspensions employed in the method according to the invention are in particular concentrations of about 0.1 to about 40 wt. %. For many applications a suspension concentration from about 1 to about 15 wt. % is particularly suitable in practice.

For economic and process technology reasons it has proved advantageous if the feed material is introduced batch-wise into the body of water to be treated or is applied batch-wise to the body of water to be treated. The optimal batch size for the respective body of water, the conditions prevailing there and the employed introduction system can be determined in situ by means of tests. In practice the introduction of the feed material into the body of water to be treated in batches of respectively about 20 to about 500 g/m$^2$ onto surface regions of respectively about 20,000 to about 100,000 m$^2$ has proved successful.

If the feed material is introduced in batches into the body of water to be treated, then the batch-wise introduction can be carried out for example by means of decontamination boats/vessels and/or by means of one or more pipeline distribution systems. In this connection the decontamination vessel and the pipeline distribution system can also operate in an alternate mode for the addition of feed material. According to a further embodiment of the invention the introduction by means of the decontamination vessel can take place for example during the daytime, and at night the introduction can be continued by means of a pipeline distribution system. A simultaneous introduction of the feed material by means of the decontamination vessel and pipeline distribution system is also possible.

In practice it has proved convenient if the batch-wise introduction is effected by means of the decontamination vessel and/or by means of an alternate operation of a decontamination vessel and a pipeline distribution system.

Decontamination vessels for treating acidic bodies of water with alkaline substances are known for example from WO 2009/037194 A2, the disclosure content of which is hereby expressly referred to. When reference is made here to decontamination vessels, this is understood to mean all waterborne craft that are able to apply alkaline feed materials to the surface of a body of water or introduce such materials into a body of water.

In practical tests the introduction of the feed material according to the invention by means of water-borne craft has proved particularly advantageous.

Accordingly the invention also envisages a water-borne craft for introducing a feed material according to the invention, in particular an unburnt lime product with a granularity having a fraction <10 µm of ≥50%, into a body of water to be treated, wherein the water-borne craft includes at least one storage holder that contains the feed material. Optimal results are obtained if the water-borne craft comprises at least in part the features of the decontamination vessel described in WO 2009/037194 A2.

A further preferred embodiment of the invention envisages introducing the feed material according to the invention by means of pipeline distribution systems.

Pipeline distribution systems that are suitable for introducing alkaline feed materials into acidic bodies of water to treat the latter are described for example in DE 102009049739 A1. Reference is also hereby expressly made to the disclosure content of this printed specification.

In this connection the pipeline distribution system preferably operates in an alternate mode for the addition of the feed material. It has proved advantageous to adjust the time intervals of the alternate operation of the pipeline distribution system with introduction of feed material depending on the wind direction and the wind velocity. A good distribution of the feed material can be ensured with such a procedure.

In practice optimal results can be achieved for example if the alternate operation of the pipeline distribution system with introduction of feed material is established starting from a wind velocity of ≤about 1 m/sec. At a lower wind velocity the pipeline distribution system with introduction of feed material remains inoperative. The pipeline distribution system can in this case continue to operate and be flushed with lake water without the introduction of feed material.

With regard to the downtimes and time intervals of the alternate operation of the pipeline distribution system, practical tests have shown that the time intervals are preferably adjusted according to a fixed operating time, in particular according to an operating time of about one and a half hours and/or with a wind velocity-dependent downtime in a time interval of $$Z\text{ (time interval in hrs.)}=3\times V\text{ (wind velocity in km/hr.)}/V^2.$$

In this connection the downtimes for the introduction of feed material of the pipeline distribution system at high wind velocities are directly dependent on the wind velocity, and at high wind velocities are shorter than at low wind velocities.

What has been said hereinbefore regarding the dependence on wind velocity and introduction of feed material applies equally to the introduction of the feed material by means of a decontamination vessel. Thus, an advantageous embodiment of the invention envisages that when using a decontamination vessel the parameters of the feed material introduction, such as for example the amount, batch sizes, travel direction, application surface and introduction mode, are adjusted according to the wind strength and wind direction.

The charging of the feed material can take place both above water as well as under water. Practical tests have shown that it is particularly beneficial and advantageous for a still existing biocoenosis of a body of water if the distribution of the feed material in the free, relatively deep body of water takes place above water, whereas in the shore region the distribution of the feed material takes place under water.

Optimal results are also achieved with the feed material according to the invention in regions of a body of water that can be accessed only with difficulty by water-borne craft or for pipe-laying purposes. Thus, it has been shown that the buffer cloud formed by the fine-grain feed material in the body of water also drifts into regions of the body of water that were not directly treated. This is probably due to the particularly fine particle size of the feed material, or of the unburnt lime product contained therein, which is thus able to float and is distributed practically by itself by the natural current in the body of water. This effect can be particularly advantageously utilised if the introduction of feed material takes place at a natural opening or inflow into the body of water to be treated. An optimal distribution of the feed material thus takes place due to the current-induced diffusion of the cloud of feed material in the body of water.

Practical tests have also shown that with the method according to the invention, as well as the advantageous modifications of the invention described hereinbefore and in the sub-claims, a product or buffer cloud can be established in a layer thickness of up to about 10 m in the body of water for relatively long periods of time, wherein the pH in this buffer cloud does not as a rule exceed about 7.5.

The formation of the buffer cloud after introduction of the feed material according to the invention can be observed under suitable conditions in situ by aerial photography over the treated body of water.

The buffer cloud can be formed by the method according to the invention for periods of up to three months, without the feed material components sinking completely to the bottom of the body of water. This applies in particular to the case where the input of acidity via ground water or other sources is less than the alkalinity potential of the buffer cloud. The advantage of forming buffer clouds is that costly and complicated short-term successive post-treatments are avoided, and prolonged periods of time such as during the winter when the body of water is covered with ice can be handled without any problems.

The disadvantages of a possible harm to the biocoenosis, unsatisfactory effectiveness, possible overdosing, high overall costs and in particular a rapid re-acidification are largely avoided by the use of the method according to the invention. Finally, with the proposed method the pH stabilisation as well as in particular the aftercare can be achieved in an overall cost-effective manner by the use of unburnt lime products.

The principle of the invention will be described in more detail hereinafter by examples.

EXAMPLE 1

An opencast mining lake with a volume of 10 million $m^3$ which over a period of 6 months had become acidified from an initial pH value of 7 to a pH value of 5.8 as a result of the influence of ground water, is to be treated. The amount of neutralising agent required to restore a pH value of 7 is calculated to be 0.3 mmol/l.

A fine chalk with a proportion of $CaCO_3$ of 90 wt. % is used as feed material for the treatment of the opencast mining lake. The granularity of the feed material is determined with a laser diffraction sensor (Helos, Sympatec company). The D-50 value of the feed material is between 2 and 4 μm. The feed material has a granularity of <20 μm. The overall efficiency of the feed material is found to be 80% in a pilot plant test.

About 650 tonnes of fine chalk are used for the lake treatment. The feed material is transported by means of silo lorries to the shore of the lake and is discharged there in six-tonne batches into the storage container of a distribution vessel, from which it is distributed as a 4% feed material suspension over a period of 20 minutes with 150 $m^3$ of lake water onto the surface of a body of water 1,500 m long and 40 m wide (60,000 $m^2$) in a charging amount of 100 $g/m^2$. After each refilling of the storage container of a distribution vessel the feed material suspension is applied to another region of the lake surface. As a rule the feed material suspension is applied to the same region of the lake surface only once a day.

The total amount of feed material is introduced into the body of water over a period of ca. 2 weeks. After the implementation of the method the pH value is about 7.0 and the acid capacity in the form of the $K_{s\,4.3}$ value is ca. 0.45 mmol/l. With the method according to the invention a stabilisation and improvement of the water quality both in terms of the pH and the acid buffer can be achieved by the treatment according to the invention.

The diffusion of the feed material suspension introduced under and above the surface of the water by the decontamination vessel is monitored by aerial photography. It is found that, depending on the current and wind direction, the buffer cloud also drifts into regions of the lake that can be accessed only with difficulty by the decontamination vessel and are therefore not directly treated.

Due to the treatment of the acid potential until a pH of 7 is reached and the additional establishment of a buffer cloud with a total weight of unconsumed fine chalk of ca. 220 tonnes in the body of water, with a constant input of acidity into the body of water a renewed treatment is necessary only after about 9 months.

EXAMPLE 2 (COMPARISON EXAMPLE)

An opencast residual lake had a weakly acidic pH value. Unburnt chalk flour with a D-50 value of >12 μm was used as feed material for treating the lake. The feed material was introduced from a water-borne craft into the body of water. A large part of the feed material sank to the bottom of the lake without having reacted. After the treatment a short-term neutralisation of the area of the lake was detected in the immediate vicinity of the introduced material. Due to inflow of acidic ground water the lake became re-acidified a short time after the treatment, and a re-treatment was necessary.

The invention has been described hereinbefore on the basis of exemplary embodiments. It is understood that the invention is not restricted to the described embodiments. Rather, the person skilled in the art will be able to implement numerous possible changes and modifications within the context of the invention, and the scope of protection of the invention is specified in particular by the following claims.

What we claim is:

1. A method for treating strongly acidic bodies of water by introducing a feed material into said body of water, the method comprising:
   in a first step, the pH of the body of water is raised from the strongly acidic pH range to the weakly acidic pH range of about 5 to about 7.5 consisting essentially of introducing a first unburnt lime product with a D-50 value of more than 10 μm; and
   in a second step, the body of water is treated with a feed material that contains a second unburnt lime product having over 85% by weight of $CaCO_3$ for stabilizing the pH and/or buffering, wherein 50% or more of the second unburnt lime product has a granularity of less than about 4 μm mean particle size.

2. The method according to claim 1, wherein 50% or more of the second unburnt lime product has a granularity of less than about 3 μm mean particle size.

3. The method according to claim 2, wherein the second unburnt lime product has a granularity with a mean particle size of about 0.05 to about 40 μm.

4. The method according to claim 2, wherein the second unburnt lime product has a granularity with a mean particle size of about 0.05 to about 20 μm.

5. The method according to claim 4, wherein the first unburnt lime product comprises over 85% by weight of $CaCO_3$; wherein the first and/or second unburnt lime products are fine chalk.

6. The method according to claim 5, wherein the feed material is introduced in the form of a suspension in water into the body of water to be treated, or is applied to the body of water to be treated.

7. The method according to claim 6 wherein the feed material is introduced or applied to the body of water from a charging systems with a suspension concentration of about 1 to about 15 wt. % and the feed material is applied batch-wise with respectively about 20 to about 500 g/m² to surface areas of respectively about 20,000 to about 100,000 m².

8. The method according to claim 2, wherein the first unburnt lime product comprises over 85% by weight of $CaCO_3$.

9. The method according to claim 1, wherein the second unburnt lime product has a granularity with a mean particle size of about 0.05 to about 40 μm.

10. The method according to claim 9, wherein the first unburnt lime product comprises over 85% by weight of $CaCO_3$.

11. The method according to claim 1, wherein the first unburnt lime product comprises over 85% by weight of $CaCO_3$.

12. The method according to claim 1, wherein the first and/or second unburnt lime products are fine chalk.

13. The method according to claim 1, wherein the feed material is introduced in the form of a suspension in water into the body of water to be treated, or is applied to the body of water to be treated.

14. The method according to claim 13, wherein the feed material is introduced or applied to the body of water from a charging systems with a suspension concentration of about 1 to about 15 wt. %.

15. The method according to claim 1 wherein the feed material is applied batch-wise with respectively about 20 to about 500 g/m² to surface areas of respectively about 20,000 to about 100,000 m².

16. The method according to claim 15 wherein the feed material is introduced batch-wise into the body of water and the batch-wise charging is carried out by means selected from one or more of the following: decontamination vessel charging, a pipeline distribution system, or an alternate operation of a decontamination vessel and a pipeline distribution system.

17. The method according to claim 16 wherein the time intervals of when the batch-wise charging of feed material into the body of water is used with an alternate operation of the pipeline distribution system then the batch-wise charging of feed material into the body of water is adjusted depending on the wind direction and the wind velocity.

18. The method according to claim 17, wherein when the batch-wise charging of feed material into the body of water is used with the alternate operation of the pipeline distribution system then the batch-wise charging of feed material into the body of water is discontinued when the wind velocity is less than about 1 m/sec.

19. The method according to claim 1, wherein the second unburnt lime product has a granularity with a mean particle size of about 0.05 to about 20 μm.

* * * * *